(12) United States Patent
Zheng et al.

(10) Patent No.: US 11,608,087 B2
(45) Date of Patent: Mar. 21, 2023

(54) TRANSITIONING STEERING CONTROL FROM AN AUTONOMOUS VEHICLE TO A DRIVER

(71) Applicant: TUSIMPLE, INC., San Diego, CA (US)

(72) Inventors: Kaixin Zheng, San Diego, CA (US); Xiaoling Han, San Diego, CA (US); Zehua Huang, San Diego, CA (US); Charles A. Price, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 323 days.

(21) Appl. No.: 16/870,841

(22) Filed: May 8, 2020

(65) Prior Publication Data

US 2020/0361494 A1 Nov. 19, 2020

Related U.S. Application Data

(60) Provisional application No. 62/847,289, filed on May 13, 2019.

(51) Int. Cl.
*B60W 60/00* (2020.01)
*B60W 40/105* (2012.01)
(Continued)

(52) U.S. Cl.
CPC ........ *B60W 60/0055* (2020.02); *B60W 10/20* (2013.01); *B60W 40/105* (2013.01);
(Continued)

(58) Field of Classification Search
CPC ............. B60W 60/0055; B60W 10/20; B60W 40/105; B60W 60/0057; B60W 2540/18;
(Continued)

(56) References Cited

U.S. PATENT DOCUMENTS 9,342,074 B2 5/2016 Dolgov et al.
2012/0109461 A1 5/2012 Nitta et al.
(Continued)

FOREIGN PATENT DOCUMENTS

EP 3560784 A1 10/2019
JP H11198839 A 7/1999
WO 2018116654 A1 6/2018

OTHER PUBLICATIONS

Extended European Search Report for European Patent Application No. 20173328.4, dated Oct. 28, 2020.
(Continued)

*Primary Examiner* — Brian P Sweeney
(74) *Attorney, Agent, or Firm* — Paul Liu; Glen Theodore Mathews; Perkins Coie, LLP

(57) ABSTRACT

Techniques are described for transitioning control of a steering system from an autonomous mode in a vehicle to a driver-controlled mode where the driver can control the steering wheel of the steering system. A method includes receiving values that describe an amount of torque and a direction of torque in response to a torque applied to a steering wheel of a steering system operated in an autonomous mode, determining that the values are either greater than or equal to a threshold value or are less than or equal to a negative of the threshold value, determining that the values are measured over a period of time greater than or equal to a pre-determined amount of time, and transitioning the steering system from being operated in the autonomous mode to being operated in a driver-controlled mode in which the steering system is under manual control.

20 Claims, 4 Drawing Sheets

(51) Int. Cl.
*B60W 10/20* (2006.01)
*B62D 6/10* (2006.01)

(52) U.S. Cl.
CPC ............ *B60W 60/0057* (2020.02); *B62D 6/10* (2013.01); *B60W 2540/18* (2013.01)

(58) Field of Classification Search
CPC ......... B60W 2520/10; B60W 2556/50; B60W 60/0053; B60W 50/082; B60W 60/0059; B62D 6/10; B62D 15/025; B62D 1/286
See application file for complete search history.

(56) References Cited

U.S. PATENT DOCUMENTS

| | | | | |
|---|---|---|---|---|
| 2012/0283910 | A1* | 11/2012 | Lee | B62D 1/286 |
| | | | | 701/41 |
| 2013/0060413 | A1 | 3/2013 | Lee et al. | |
| 2013/0253767 | A1* | 9/2013 | Lee | B60W 50/04 |
| | | | | 701/41 |
| 2017/0203788 | A1 | 7/2017 | Heo | |
| 2019/0054950 | A1 | 2/2019 | Farhat et al. | |

OTHER PUBLICATIONS

Examination Report from corresponding European Patent Application No. 20173328.4, dated Dec. 5, 2022 (8 pages).

\* cited by examiner

TRANSITIONING STEERING CONTROL FROM AN AUTONOMOUS VEHICLE TO A DRIVER

PRIORITY CLAIMS AND RELATED PATENT APPLICATIONS

This patent document claims the priority to and the benefits of U.S. Provisional Application No. 62/847,289 entitled "TRANSITIONING STEERING CONTROL FROM AN AUTONOMOUS VEHICLE TO A DRIVER" filed on May 13, 2019, which is incorporated by reference as part of this patent document.

TECHNICAL FIELD

This document relates to systems, apparatus, and methods to control steering of an autonomous vehicle.

BACKGROUND

Autonomous vehicle navigation is a technology that can allow a vehicle to sense the position and movement of vehicles around an autonomous vehicle and, based on the sensing, control the autonomous vehicle to safely navigate towards a destination. An autonomous vehicle may control the steering angle, a throttle amount to control the speed of the autonomous vehicle, gear changes, and/or a breaking amount to control the extent to which the brakes are engaged. An autonomous vehicle may operate in several modes. In some cases, an autonomous vehicle may allow a driver to operate the autonomous vehicle as a conventional vehicle by controlling the steering, throttle, clutch, gear shifter, and/or other devices. In other cases, a driver may engage the autonomous vehicle navigation technology to allow the vehicle to be driven by itself.

SUMMARY

This patent document describes systems and methods for transitioning control of a steering wheel of a vehicle operating in an autonomous mode to a driver-controlled mode where a driver can control the steering wheel of the vehicle.

In an exemplary embodiment a method is disclosed for receiving a set of values in which each value indicates an amount of torque and a direction of torque in response to a torque applied to a steering wheel of a steering system in a vehicle, where the torque is applied to the steering wheel while the steering system is operated in an autonomous mode without manual control; making a first determination that either each value is greater than or equal to a threshold value or each value is less than or equal to a negative of the threshold value; making a second determination that a period of time over which the set of values is measured is greater than or equal to a pre-determined amount of time; and disabling, in response to the first determination and the second determination, the steering system from being operated in the autonomous mode, where the disabling the steering system transitions the steering system from being operated in the autonomous mode to being operated in a driver-controlled mode in which the steering system is under manual control.

In some embodiments, the steering system is disabled by not sending one or more control commands that control one or more motors of the steering system. In some embodiments, the one or more control commands include: a position control command that indicates an amount of angular displacement or a position of a steering wheel of the steering system, or a torque control command that indicates an amount of torque to apply to the steering wheel. In some embodiments, the steering system is disabled by sending a command to disable one or more modes of the steering system that enable the steering system to receive a position control command or a torque control command, where the position control command indicates an amount of angular displacement or a position of a steering wheel of the steering system, and where the torque control command indicates an amount of torque to apply to the steering wheel.

In some embodiments, the threshold value is selected based on a speed of the vehicle. In some embodiments, the threshold value and the speed of the vehicle are inversely related. In some embodiments, the threshold value and the speed of the vehicle are inversely related according to any one of a linear function, a non-linear function, and a discontinuous function. In some embodiments, the direction of torque for each value is indicated by either a positive sign or a negative sign.

In some embodiments, the steering system is disabled by the processor configured to not send a position control command that controls a motor of the steering system, and the position control command indicates a position of the steering wheel of the steering system. In some embodiments, the steering system is disabled by the processor configured to not send a torque control command to a motor of the steering system, and the torque control command indicates an amount of torque to apply to the steering wheel. In some embodiments, the steering system is disabled by the processor configured to send a command to disable one or more modes of the steering system that enable the steering system to receive a torque control command, and the torque control command indicates an amount of torque to apply to the steering wheel.

In some embodiments, the threshold value is selected based on a speed of the vehicle, where the threshold value and the speed of the vehicle are inversely related according to a non-linear function. In some embodiments, the threshold value is selected based on a speed of the vehicle, where the threshold value and the speed of the vehicle are inversely related according to a discontinuous function. In some embodiments, the direction of torque for at least some of the set of values is indicated by either a positive sign or a negative sign.

In some embodiments, the steering system is disabled by sending a command to disable one or more modes of the steering system that enable the steering system to receive a command with which the steering wheel of the steering system is controlled. In some embodiments, the threshold value is selected based on a speed of the vehicle, and wherein the threshold value and the speed of the vehicle are related according to a mathematical function. In some embodiments, the direction of torque for each value is indicated by a direction indicator. In some embodiments, set of values are periodically measured by a torque sensor In yet another exemplary aspect, the above-described method is embodied in a non-transitory computer readable program stored on a non-transitory computer readable media. The computer readable program includes code that when executed by a processor, causes the processor to perform the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

A vehicle may operate in an autonomous mode to safely navigate on a road. In an autonomous mode, an in-vehicle control computer can control systems such as the steering system, a throttle, and/or a brake unit. In some cases, however, a driver may disengage the autonomous mode and may intervene to control the steering of the vehicle in a driver-controlled mode. For example, a driver may take over control of the steering wheel to navigate the vehicle in case of an emergency or to make an impromptu stop. As described in various example embodiments, a system and method for transitioning control of the steering system from the autonomous vehicle to a driver are described in this patent document.

Figure 1:
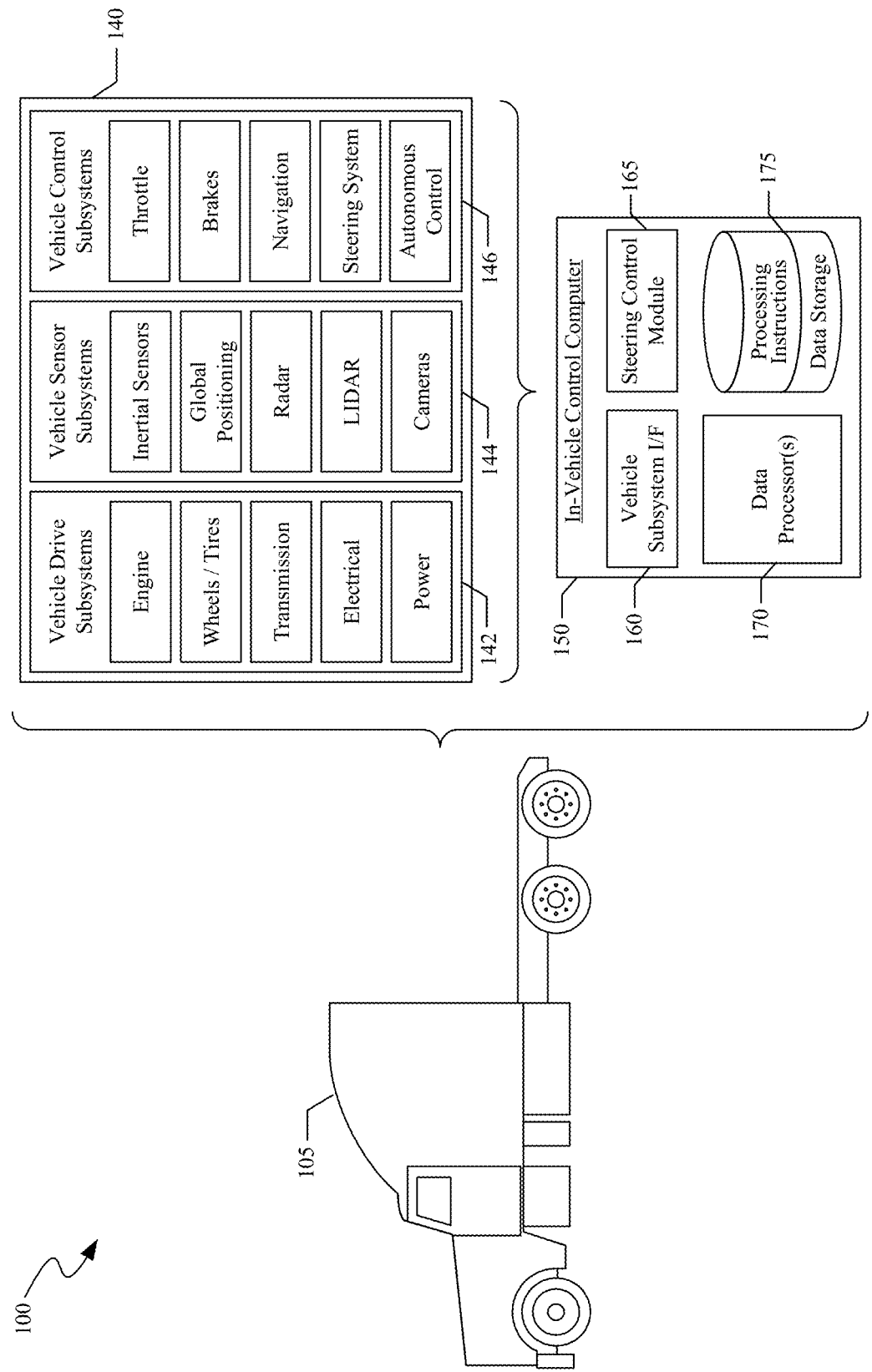
FIG. 1 shows a block diagram of an example ecosystem in which operations related to steering control can be implemented.

FIG. 1 shows a block diagram of an example vehicle ecosystem 100 in which operations related to steering control can be implemented in an in-vehicle control computer 150. The vehicle ecosystem 100 includes several systems and components that can generate and/or deliver one or more sources of information/data and related services to the in-vehicle control computer 150 that may be located in a vehicle 105. Examples of vehicle 105 include a car, a truck, or a semi-trailer truck. The in-vehicle control computer 150 can be in data communication with a plurality of vehicle subsystems 140, all of which can be resident in a user's vehicle 105. A vehicle subsystem interface 160 is provided to facilitate data communication between the in-vehicle control computer 150 and the plurality of vehicle subsystems 140.

The vehicle 105 may include various vehicle subsystems that support of the operation of vehicle 105. The vehicle subsystems may include a vehicle drive subsystem 142, a vehicle sensor subsystem 144, and/or a vehicle control subsystem 146. The vehicle drive subsystem 142 may include components operable to provide powered motion for the vehicle 105. In an example embodiment, the vehicle drive subsystem 142 may include an engine, wheels/tires, a transmission, an electrical subsystem, and a power source.

The vehicle sensor subsystem 144 may include a number of sensors configured to sense information about an environment or condition of the vehicle 105. For example, the vehicle sensor subsystem 144 may include an inertial measurement unit (IMU), a Global Positioning System (GPS) transceiver, a RADAR unit, a laser range finder/LIDAR unit, and/or one or more cameras or image capture devices. The vehicle sensor subsystem 144 may also include sensors configured to monitor internal systems of the vehicle 105 (e.g., an 02 monitor, a fuel gauge, an engine oil temperature).

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. The cameras may include one or more devices configured to capture a plurality of images of the environment of the vehicle 105. The cameras may be still image cameras or motion video cameras.

The vehicle control system 146 may be configured to control operation of the vehicle 105 and its components. Accordingly, the vehicle control system 146 may include various elements such as a throttle, a brake unit, a navigation unit, a steering system and/or an autonomous control unit.

The throttle may be configured to control, for instance, the operating speed of the engine and, in turn, control the speed of the vehicle 105. The brake unit can include any combination of mechanisms configured to decelerate the vehicle 105. The brake unit can use friction to slow the wheels in a standard manner. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the GPS transceiver and one or more predetermined maps so as to determine the driving path for the vehicle 105. The steering system may represent any combination of mechanisms that may be operable to adjust the heading of vehicle 105 in an autonomous mode or in a driver-controlled mode.

Figure 2:
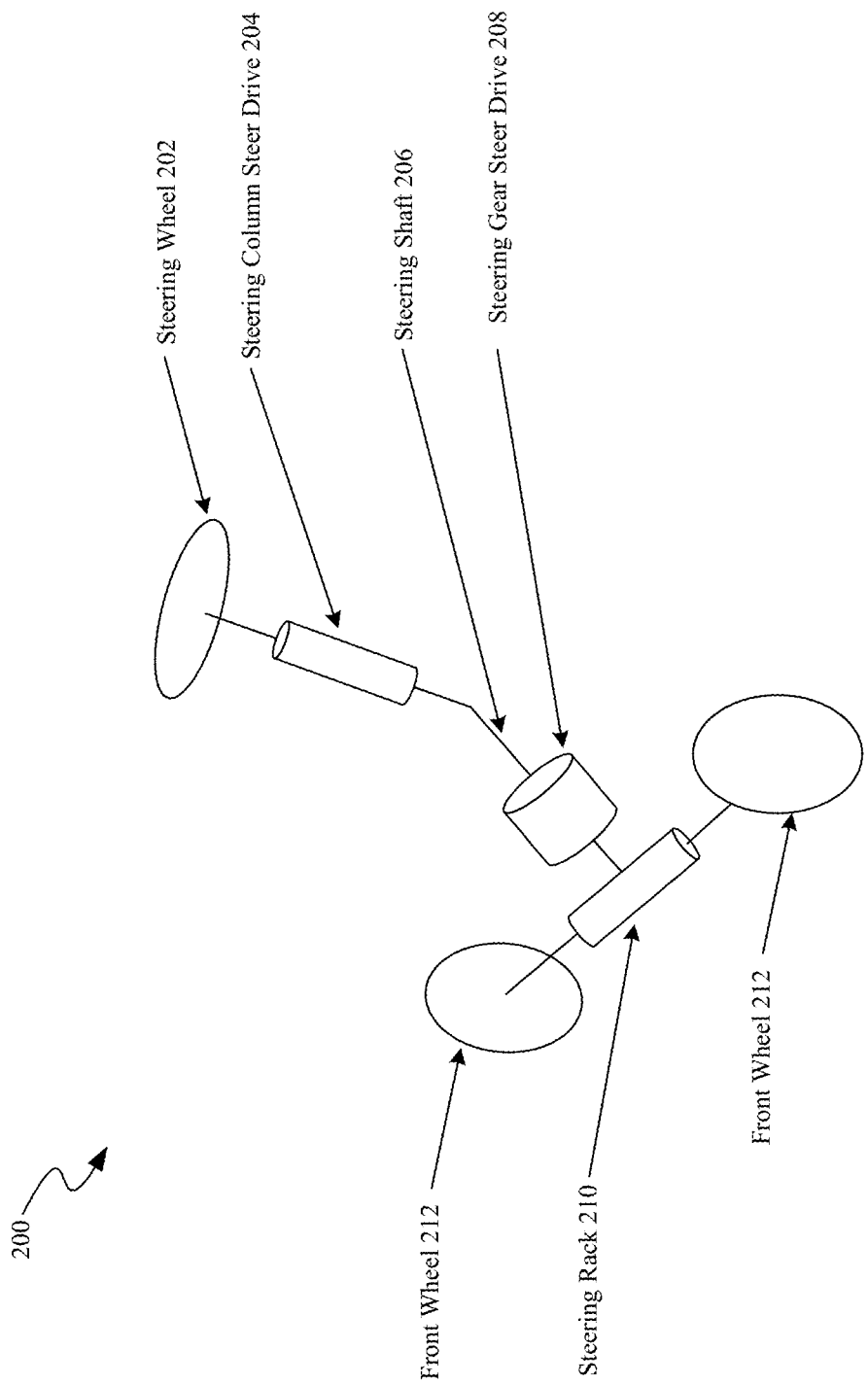
FIG. 2 shows a diagram of a steering system coupled to the front wheels of a vehicle.

FIG. 2 shows a diagram of a steering system coupled to the front wheels of a vehicle. The steering system 200 includes a steering wheel 202 that may be connected to a steering column steer drive 204 that can include a motor to assist the steering column to turn the steering shaft 206. The steering shaft 206 may couple the steering column steer drive 204 to the steering gear steer drive 208. The steering gear steer drive 208 may include a motor to assist the steering rack 210 to turn the front wheels 212. The steering rack 210 may couple the front wheels 212 to the steering gear steer drive 208. In some embodiments, the motor of the steering gear steer drive 208 may assist a steering rack coupled to the rear wheels so that the rear wheels can be turned.

In some embodiments, the steering column steer drive 204 or the steering gear steer drive 208 may include a microcontroller and a memory, where the microcontroller may store in the memory control modes to operate the steering control steer drive 204 or the steering gear steer drive 208. The control modes may include (1) position, (2) torque, (3) power assist, and/or (4) passive. When the steering devices 204 and/or 208 are operated in a position control mode, the autonomous control unit provides a position control command via the steering control module, where the position control command may indicate to the steering system the amount of angular displacement or the position of the steering wheel. When the steering devices 204 and/or 208 are operated in a torque control mode, the autonomous control unit provides the torque control command via the steering control module, where the torque control command can indicate the amount of torque to be applied to the steering wheel. When the steering devices 204 and/or 208 are operated in a power assist control mode the power steering feature can be enabled or disabled. When the steering devices 204 and/or 208 are operated in a passive control mode, the steering devices 204 or 204 does not process or operate on commands received from the autonomous control unit and/or power assist control mode may be disabled so that power steering may be disabled. The steering devices 204 and/or 208 may be operated in one or more control modes. The steering control module may send commands to the steering devices 204 and/or 208 to enable or disable the control modes.

Referring to FIG. 1, when a vehicle 105 is being operated in an autonomous mode, one or more motors included in the steering system may control a steering angle of the steering wheel so that the vehicle may be steered to a desired direction. The motor(s) may receive signals (e.g., position control command and/or torque control command) from the autonomous control unit via the steering control module 165 to control the steering angle of the steering wheel. For example, the steering control module 165 may send a command to operate the steering column steer drive and/or the steering gear steer drive to operate in a position control mode, and the autonomous control unit can send the position control command to the steering column steer drive and/or the steering gear steer drive to control the amount of steering of the vehicle 105.

The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the GPS transceiver, the RADAR, the LIDAR, the cameras, and/or other vehicle subsystems to determine the driving path or trajectory for the vehicle 105.

The steering control module 165 controls the control modes of the steering column steer drive and/or the steering gear steer drive so that the steering control module 165 can disengage autonomous mode operation in situations where a driver initiates a driver-controlled mode where the driver controls the steering wheel of the vehicle. The steering control module 165 can determine that a driver has initiated a transition from an autonomous mode to a driver-controlled mode based on measurements obtained by the steering control module 165 from the steering system. In some embodiments, the steering system may include sensor(s) that can measure and provide an amount of torque and/or direction in which the torque is applied to one or more motors of the steering system.

Referring to FIG. 2, the sensor(s) may be located in the steering column steer drive 204 and/or the steering gear steer drive 208. The sensors may also provide to the steering control module information related to steering wheel speed, steering wheel torque, a commanded steering position or torque (e.g., from the autonomous control unit), and actual or current steering wheel position. The steering column steer drive 204 and/or the steering gear steer drive 208 can measure an amount of torque and/or the direction of torque applied to the steering system operated in an autonomous mode and/or applied to the steering wheel in a driver-controlled mode where the driver controls the steering wheel of the vehicle. When a driver decides to take control of the steering wheel, the driver may turn the steering wheel or refuse to let the steering wheel move to indicate that he or she wants to disengage autonomous mode operation and transition to a driver-controlled mode.

Referencing back to FIG. 1, using the techniques described in this patent document, the steering control module 165 can determine that a driver wants to disengage autonomous mode and take manual control over the steering system. In some embodiments, upon determining that the driver wants to take control of the steering system, the steering control module 165 can determine not to send one or more control commands (e.g., position control command and/or torque control command) that control one or more motors of the steering system in the autonomous mode. In some embodiments, upon determining that the driver wants to take control of the steering system, the steering control module 165 can send a command to the steering column steer drive and/or the steering gear steer drive to disable at least the position and/or torque control modes.

In some embodiments, the steering control module 165 may determine that a driver wants to operate the vehicle in a driver-controlled mode by determining that torque values measured by the sensor(s) are greater than or equal to a threshold value, where the torque values indicate that a torque applied by the driver is in a same direction, and where the torque values are obtained or measured over a period of time greater than or equal to a pre-determined amount of time. In some embodiments, the sensor(s) located in the steering system may provide a direction indicator information (e.g., a positive sign or a negatives sign) that can indicate whether the steering wheel is being turned clockwise or counterclockwise. For example, the sensor(s) may provide a set of torque values and associated direction indicator such as {+1.2, +1.3, +1.1, +0.95, +1.2, +1.2, +1.1, +1.1, +1.1, +1.3, +1.3, +1.1, +1.0, +1.0, +1.0, +1.1} for a period of time (e.g., 160 milliseconds, where the torque values and direction indicators are obtained at a regular interval (e.g., every 10 milliseconds). In this example, if the threshold value is +0.9 and if the pre-determined amount of time is 150 milliseconds, then the steering control module 165 can determine that the drive wants to manually control the steering system. In an example implementation the torque values can be measured by a torque measurement sensor or a torque transducer.

By analyzing the torque values, the period of time over which the torque values are measured, and/or direction of torque associated with the torque values, the steering control module 165 can filter situations where the driver has turned the steering wheel from situations where steering wheel may move due to vibrations or disturbances caused by driving on a road. Thus, the steering control module 165 may filter out situations where steering wheel may randomly move due to random vibrations or disturbances and may not move in one direction for a time period that is greater than or equal to a pre-determined amount of time.

The steering control module 165 may adjust the threshold value to which the measured torque is compared based on receiving the speed of the vehicle 105. The steering control module 165 adjust the threshold value based on the speed of the value at least because more torque may be required to turn a steering wheel at a given steering angle at lower speeds compared to at higher speeds. Thus, for a given steering angle, a steering system operating in an autonomous mode may receive signals from an autonomous control unit that indicate a higher torque value to turn a steering wheel at lower speeds than at higher speeds. For example, when the vehicle 105 has a speed close to zero, the steering control module 165 may select a first threshold value, and when the vehicle 105 has a speed close to 65 mph, the steering control module 165 may select a second threshold value that may be lower than the first threshold value. Thus, the steering control module 165 may adjust the threshold value as a function of the speed of the vehicle 105, where the threshold value and the speed have an inverse relationship. The torque threshold value can be adjusted as a function of vehicle's speed by using a linear function, a non-linear function, or a discontinuous function.

In some embodiments, the torque measured by the sensor (s) may include both the torque applied by the steering device(s) (204 and/or 208 in FIG. 2) and the torque applied by the driver at the steering wheel. In such embodiments, the steering control module may select the threshold value based on the torque applied by the steering device(s) and based on the speed of the vehicle.

The steering control module 165 disengages autonomous mode to enable the driver to operate the vehicle in a driver-controlled mode. The steering control module 165 can disengage autonomous mode by not sending the position control command and/or torque control command to the steering system. In some embodiments, the steering control module 165 may send a command to the autonomous control unit to disable autonomous mode operation. In some embodiments, in a driver-controlled mode, the steering control module 165 may enable the driver to operate the steering system in a power assist control mode or in a passive control mode.

Many or all of the functions of the vehicle 105 can be controlled by the in-vehicle control computer 150. The in-vehicle control computer 150 may include at least one data processor 170 (which can include at least one microprocessor) that executes processing instructions stored in a non-transitory computer readable medium, such as the data storage device 175 or memory. The in-vehicle control computer 150 may also represent a plurality of computing devices that may serve to control individual components or subsystems of the vehicle 105 in a distributed fashion. In some embodiments, the data storage device 175 may contain processing instructions (e.g., program logic) executable by the data processor 170 to perform various methods and/or functions of the vehicle 105, including those described in this patent document. For instance, the data processor 170 executes the operations associated with steering control module 165 for transitioning control of the steering system from the autonomous vehicle operation to the driver. The data storage device 175 may contain additional instructions as well, including instructions to transmit data to, receive data from, interact with, or control one or more of the vehicle drive subsystem 142, the vehicle sensor subsystem 144, and the vehicle control subsystem 146. The in-vehicle control computer 150 can be configured to include a data processor 170 and a data storage device 175. In some embodiments, the vehicle control computer 150 may include a vehicle control unit (VCU) and a computer server which can include one or more computers. The VCU may perform the operations described in this patent document for the steering control module 165.

The in-vehicle control computer 150 may control the function of the vehicle 105 based on inputs received from various vehicle subsystems (e.g., the vehicle drive subsystem 142, the vehicle sensor subsystem 144, and the vehicle control subsystem 146). For example, the in-vehicle control computer 150 may use input from the vehicle control system 146 in order to control the steering system to avoid an obstacle detected by the vehicle sensor subsystem 144 and the steering control module 165, move in a controlled manner, or follow a path or trajectory based on output generated by the steering control module 165. In an example embodiment, the in-vehicle control computer 150 can be operable to provide control over many aspects of the vehicle 105 and its subsystems.

Figure 3:
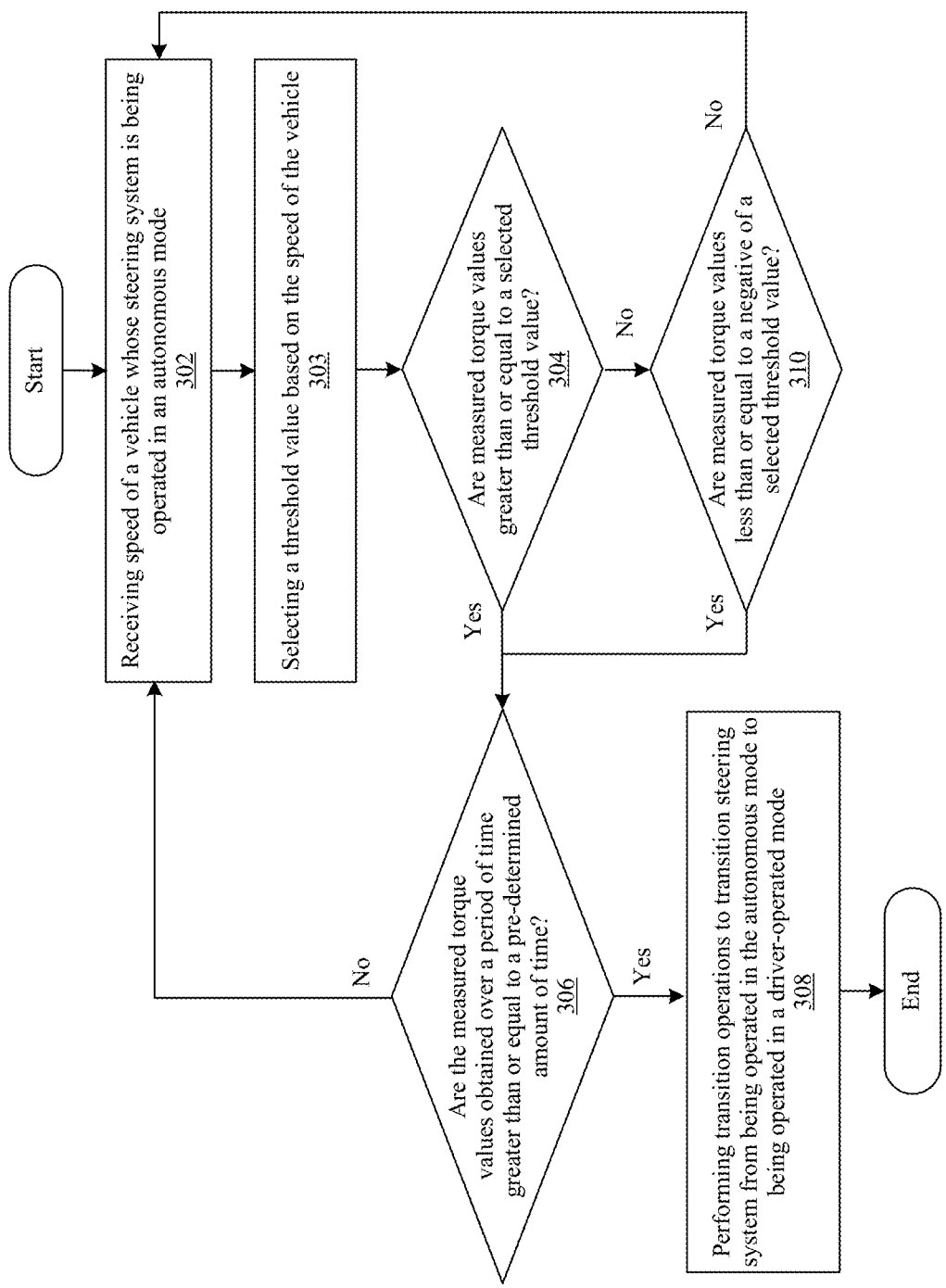
FIG. 3 shows an exemplary flow diagram of operations performed by a steering control module to analyze the set of measured values that each describe an amount of torque and a direction of torque applied to a steering wheel.

FIG. 3 shows an exemplary flow diagram of operations performed by a steering control module to analyze the set of measured values that each describe an amount of torque and a direction of torque applied to a steering wheel. The flow diagram in FIG. 3 can enable the steering control module can determine that a driver wants to disengage autonomous mode and take manual control over the steering system. In FIG. 3, at the receiving operation 302, the steering control module receives a speed of a vehicle whose steering system is being operated in an autonomous mode and/or an amount of torque measured by the steering system sensor(s). The receiving operation 302 may be performed periodically (e.g., for each 10-millisecond cycle) so that a set of values may be obtained for speed and/or torque over a period of time.

At the selecting operation 303, the steering control module can determine or select a threshold value based on the speed of the vehicle. A mathematical function can describe the relationship between the threshold value and the speed. In some embodiments, the threshold value can be adjusted as a function of vehicle's speed by using an inverse linear function, an inverse non-linear function, or an inverse discontinuous function. In a first example, a threshold value can be +1.2 when the autonomous vehicle is operating at a speed less than 30 mph and the threshold value can be +0.7 when the autonomous vehicle is operating at a speed greater than 50 mph at least because more torque may be required to turn a steering wheel at a given steering angle at lower speeds compared to at higher speeds, where the threshold value can decrease from +1.2 to +0.7 in a linear manner based on the speed that increases from 30 mph to 50 mph. In a second example, using the values described in the first example above, a the threshold value can decrease from +1.2 to +0.7 in a non-linear manner so that between 30 mph and 40 mph, the rate at which the threshold value decreases is higher than the rate at which the threshold value decreases between 40 mph and 50 mph. In a third example, using the values described in the first example above, a the threshold value can decrease from +1.2 to +0.7 in a discontinuous manner so that from 30 mph to 40 mph, the threshold value is +1.2, from 40 mph to 45 mph, the threshold value is +1.0, and from 45 mph to 50 mph, the threshold value is +0.7.

At the first determining operation 304, the steering control module can receive and determine whether a set of measured values that describe an amount of torque is greater than or equal to a selected threshold value. At the first determining operation 304, if the steering control module determines that each value from the set of measured torque values is greater than or equal to the selected threshold value, then the steering control module performs the second determining operation 306.

At the second determining operation 306, if the steering control module determines that the set of measured values that describe an amount of torque are obtained or measured over a period of time that is greater than or equal to a pre-determined amount of time (e.g., 150 milliseconds), then the steering control module determines that the driver wants to take manual control of the steering system and performs the transition operation 308. In embodiments where the torque value may be periodically determined (e.g., every 25 milliseconds) by a sensor (e.g., torque sensor or torque transducer), the steering control module can determine the period of time based on a number of measured torque values. In some embodiments, the torque values may be associated with a time stamp value so that the steering control module can subtract the time stamp value of the last torque value in the set of values from the first torque value in the same set of values to obtain a period of time over which the set of measured values were obtained.

At the transition operation 308, the steering control module may disable the steering system from operating in an autonomous mode by not sending one or more control commands that control one or more motors of the steering system so that a driver may manually operate the steering system. The one or more control commands may include a position control command and/or a torque control command. In some embodiments, at the transition operation 308, the steering control module may disable the steering system from operating in the autonomous mode by sending a command to disable modes of the steering system that enable the steering system to receive a position control command or a torque control command.

At the second determining operation 306, if the steering control module determines that the set of measured torque values is obtained or measured over a period of time that is less than the pre-determined amount of time (e.g., 150 milliseconds), then the steering control module can return to the receiving operation 302.

At the first determining operation 304, if the steering control module determines that any one value from the set of measured torque values is not greater than or equal to the selected threshold value, then the steering control module performs the third determining operation 310. At the third determining operation 310, if the steering control module determines that each value from the set of measured torque values is less than or equal to a negative of the selected threshold value (e.g., −1*selected threshold value), then the steering control module performs the second determining operation 306 as described above. In some embodiments, the first determining operation 304 may be performed before the third determining operation 310. In some other embodiments, the third determining operation 310 may be performed before the first determining operation 304.

Figure 4:
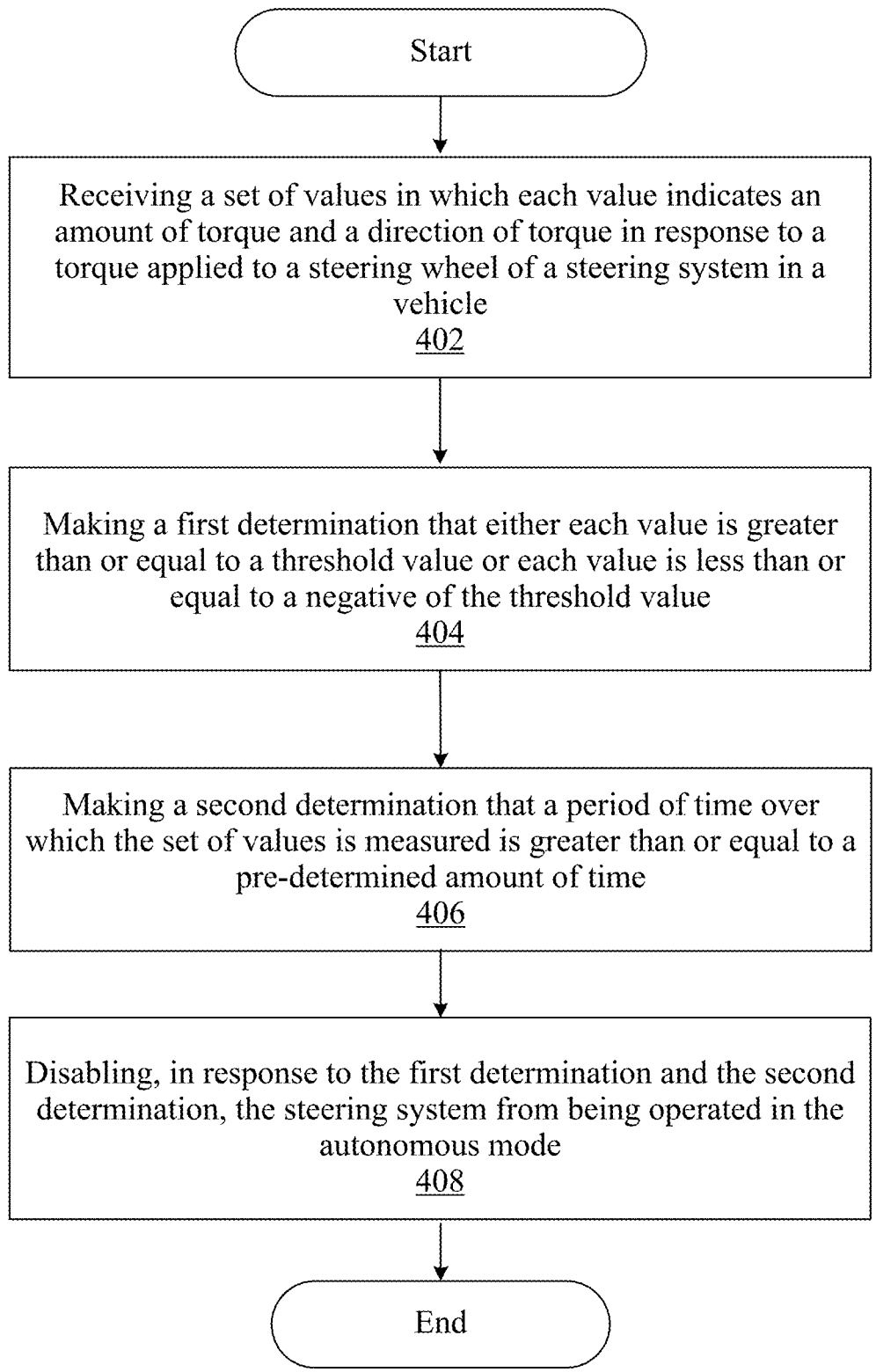
FIG. 4 shows an exemplary flow diagram of operations performed by a steering control module to transition a steering system from being operated in an autonomous mode to being operated in a driver-controlled mode.

FIG. 4 shows an exemplary flow diagram of operations performed by a steering control module to transition a steering system from being operated in an autonomous mode to being operated in a driver-controlled mode. At the receiving operation 402, the steering control module receives a set of values in which each value indicates an amount of torque and a direction of torque in response to a torque applied to or via a steering wheel of a steering system in a vehicle, where the torque is applied to the steering wheel while the steering system is operated in an autonomous mode without manual control. In the autonomous mode, one or more motors of the steering system can apply torque to the steering system. A person (e.g., driver) can apply a torque to the steering wheel when the person wants to take manual control of the steering system and operate the steering wheel in a driver-controlled mode.

At the first determining operation 404, the steering control module makes a first determination that either each value is greater than or equal to a threshold value or each value is less than or equal to a negative of the threshold value. At the second determining operation 406, the steering control module makes a second determination that a period of time over which the set of values is measured is greater than or equal to a pre-determined amount of time. In some embodiments, the first determining operation 404 may be performed before the second determining operation 406. In some other embodiments, the second determining operation 406 may be performed before the first determining operation 404.

After the steering control module performs the first determining operation 404 and the second determining operation 406, the steering control module performs the disabling operation 408. At the disabling operation 408, the steering control module disables the steering system from being operated in the autonomous mode, where the disabling of the steering system transitions the steering system from being operated in the autonomous mode to being operated in a driver-controlled mode in which the steering system is under manual control.

In some embodiments, the steering system is disabled by not sending one or more control commands that control one or more motors of the steering system. In some embodiments, the one or more control commands include: a position control command that indicates an amount of angular displacement or a position of a steering wheel of the steering system, or a torque control command that indicates an amount of torque to apply to the steering wheel. In some embodiments, the steering system is disabled by sending a command to disable one or more modes of the steering system that enable the steering system to receive a position control command or a torque control command, where the position control command indicates an amount of angular displacement or a position of a steering wheel of the steering system, and where the torque control command indicates an amount of torque to apply to the steering wheel.

In some embodiments, the threshold value is selected based on a speed of the vehicle. In some embodiments, the threshold value and the speed of the vehicle are inversely related. In some embodiments, the threshold value and the speed of the vehicle are inversely related according to any one of a linear function, a non-linear function, and a discontinuous function. In some embodiments, the direction of torque for each value is indicated by either a positive sign or a negative sign.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of controlling a steering wheel in a vehicle, comprising:
   receiving a set of values in which each value indicates an amount of torque and a direction of torque in response to a torque applied to the steering wheel of a steering system in the vehicle, wherein the torque is applied to the steering wheel while the steering system is operated in an autonomous mode without manual control;
   making a first determination that either each value is greater than or equal to a threshold value or each value is less than or equal to a negative of the threshold value, wherein the threshold value is selected based on a speed of the vehicle, and wherein the threshold value and the speed of the vehicle are inversely related;
   making a second determination that a period of time over which the set of values is measured is greater than or equal to a pre-determined amount of time; and
   disabling, in response to the first determination and the second determination, the steering system from being operated in the autonomous mode,
   wherein the disabling the steering system transitions the steering system from being operated in the autonomous mode to being operated in a driver-controlled mode in which the steering system is under manual control.

2. The method of claim 1, wherein the steering system is disabled by not sending one or more control commands that control one or more motors of the steering system.

3. The method of claim 2, wherein the one or more control commands include a position control command that indicates an amount of angular displacement of the steering wheel of the steering system.

4. The method of claim 1,
   wherein the steering system is disabled by sending a command to disable one or more modes of the steering system that enable the steering system to receive a position control command,
   wherein the position control command indicates an amount of angular displacement or a position of the steering wheel of the steering system.

5. The method of claim 1, wherein the threshold value and the speed of the vehicle are inversely related according to a linear function.

6. The method of claim 1, wherein the direction of torque for each value is indicated by either a positive sign or a negative sign.

7. A system comprising a computer that includes a processor and a memory comprising stored instructions that upon execution configure the processor to:
   receive a set of values in which each value indicates an amount of torque and a direction of torque in response to a torque applied to a steering wheel of a steering system in a vehicle, wherein the torque is applied to the steering wheel while the steering system is operated in an autonomous mode without manual control;
   make a first determination that either each value is greater than or equal to a threshold value or each value is less than or equal to a negative of the threshold value, wherein the threshold value is selected based on a speed of the vehicle, and wherein the threshold value and the speed of the vehicle are inversely related;
   make a second determination that a period of time over which the set of values is measured is greater than or equal to a pre-determined amount of time; and
   disable, in response to the first determination and the second determination, the steering system from being operated in the autonomous mode,
   wherein the steering system when disabled transitions the steering system from being operated in the autonomous mode to being operated in a driver-controlled mode in which the steering system is under manual control.

8. The system of claim 7,
   wherein the steering system is disabled by the processor configured to not send a position control command that controls a motor of the steering system, and wherein the position control command indicates a position of the steering wheel of the steering system.

9. The system of claim 7,
   wherein the steering system is disabled by the processor configured to not send a torque control command to a motor of the steering system, and wherein the torque control command indicates an amount of torque to apply to the steering wheel.

10. The system of claim 7,
wherein the steering system is disabled by the processor configured to send a command to disable one or more modes of the steering system that enable the steering system to receive a torque control command, and
wherein the torque control command indicates an amount of torque to apply to the steering wheel.

11. The system of claim 7,
wherein the threshold value and the speed of the vehicle are inversely related according to a non-linear function.

12. The system of claim 7,
wherein the threshold value and the speed of the vehicle are inversely related according to a discontinuous function.

13. The system of claim 7, wherein the direction of torque for at least some of the set of values is indicated by either a positive sign or a negative sign.

14. A non-transitory computer readable program storage medium having code stored thereon, the code, when executed by a processor, causing the processor to implement a method comprising:
receiving a set of values in which each value indicates an amount of torque and a direction of torque in response to a torque applied to a steering wheel of a steering system in a vehicle, wherein the torque is applied to the steering wheel while the steering system is operated in an autonomous mode without manual control;
making a first determination that either each value is greater than or equal to a threshold value or each value is less than or equal to a negative of the threshold value, wherein the threshold value is selected based on a speed of the vehicle, and wherein the threshold value and the speed of the vehicle are inversely related;
making a second determination that a period of time over which the set of values is measured is greater than or equal to a pre-determined amount of time; and
disabling, in response to the first determination and the second determination, the steering system from being operated in the autonomous mode,
wherein the disabling the steering system transitions the steering system from being operated in the autonomous mode to being operated in a driver-controlled mode in which the steering system is under manual control.

15. The non-transitory computer readable program storage medium of claim 14, wherein the steering system is disabled by sending a command to disable one or more modes of the steering system that enable the steering system to receive a command with which the steering wheel of the steering system is controlled.

16. The non-transitory computer readable program storage medium of claim 14, wherein the threshold value and the speed of the vehicle are related according to a mathematical function.

17. The non-transitory computer readable program storage medium of claim 14, wherein the direction of torque for each value is indicated by a direction indicator.

18. The non-transitory computer readable program storage medium of claim 14, wherein set of values are periodically measured by a torque sensor.

19. The non-transitory computer readable program storage medium of claim 14, wherein the threshold value and the speed of the vehicle are inversely related according to a non-linear function.

20. The non-transitory computer readable program storage medium of claim 14, wherein the threshold value and the speed of the vehicle are inversely related according to a discontinuous function.

\* \* \* \* \*

UNITED STATES PATENT AND TRADEMARK OFFICE
CERTIFICATE OF CORRECTION

PATENT NO. : 11,608,087 B2
APPLICATION NO. : 16/870841
DATED : March 21, 2023
INVENTOR(S) : Kaixin Zheng et al.

Page 1 of 1

It is certified that error appears in the above-identified patent and that said Letters Patent is hereby corrected as shown below:

On the Title Page

• In Item (74), under "Attorney, Agent, or Firm", in Column 2, Line 1, delete "Glen" and insert -- Glenn --, therefor.

In the Specification

• In Column 4, Line 2, delete "02 monitor," and insert -- $O_2$ monitor, --, therefor.

Signed and Sealed this
Sixteenth Day of May, 2023

Katherine Kelly Vidal
*Director of the United States Patent and Trademark Office*